United States Patent
Shin et al.

(10) Patent No.: US 9,223,696 B2
(45) Date of Patent: Dec. 29, 2015

(54) DATA STORAGE DEVICE FOR HOLDING ERASURE OF VICTIM BLOCK HAVING VALID PAGE COPIED TO MERGE BLOCK AND METHOD OF OPERATING THE SAME

(71) Applicant: SK hynix Inc., Icheon-si (KR)

(72) Inventors: Ju Yong Shin, Icheon-si (KR); Kyeong Rho Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 204 days.

(21) Appl. No.: 13/944,704

(22) Filed: Jul. 17, 2013

(65) Prior Publication Data

US 2014/0173183 A1 Jun. 19, 2014

(30) Foreign Application Priority Data

Dec. 18, 2012 (KR) .......... 10-2012-0148172

(51) Int. Cl.
*G06F 12/00* (2006.01)
*G06F 12/02* (2006.01)
*G06F 3/06* (2006.01)
*G06F 12/12* (2006.01)

(52) U.S. Cl.
CPC .......... *G06F 12/0246* (2013.01); *G06F 3/0679* (2013.01); *G06F 12/123* (2013.01); *G06F 2212/1032* (2013.01); *G06F 2212/7205* (2013.01)

(58) Field of Classification Search
CPC ................... G06F 12/0246; G06F 2212/7205; G06F 3/0679; G06F 12/123; G06F 2212/1032
USPC .................. 711/103, 118, 133, 159, 161, 170
See application file for complete search history.

(56) References Cited

U.S. PATENT DOCUMENTS

| | | | |
|---|---|---|---|
| 5,933,368 A * | 8/1999 | Ma et al. .................. | 365/185.33 |
| 2002/0184436 A1* | 12/2002 | Kim et al. ..................... | 711/103 |
| 2009/0292839 A1* | 11/2009 | Oh .................................. | 710/55 |
| 2010/0042776 A1* | 2/2010 | Seo et al. ....................... | 711/103 |
| 2010/0169544 A1* | 7/2010 | Eom et al. ..................... | 711/103 |
| 2011/0296087 A1* | 12/2011 | Kim et al. ..................... | 711/103 |
| 2012/0005415 A1* | 1/2012 | Jung et al. ..................... | 711/103 |

FOREIGN PATENT DOCUMENTS

KR 1020090121631 A 11/2009
KR 1020120063734 A 6/2012

* cited by examiner

*Primary Examiner* — Hong Kim
(74) *Attorney, Agent, or Firm* — Kilpatrick Townsend & Stockton LLP

(57) ABSTRACT

An operating method of a data storage device including non-volatile memory devices includes making a victim block list for victim blocks for which a merge operation is to be performed and copying valid pages of the victim bocks to a merge block. The method also includes determining whether there is a victim block which has an erase-held valid page selectively erasing the victim blocks included in the victim block list, according to which victim blocks have an erase-held page, and updating the victim block list according to which victim blocks are erased.

20 Claims, 10 Drawing Sheets

DATA STORAGE DEVICE FOR HOLDING ERASURE OF VICTIM BLOCK HAVING VALID PAGE COPIED TO MERGE BLOCK AND METHOD OF OPERATING THE SAME

CROSS-REFERENCES TO RELATED APPLICATION

The present application claims priority under 35 U.S.C. §119(a) to Korean application number 10-2012-0148172, filed on Dec. 18, 2012, in the Korean Intellectual Property Office, which is incorporated herein by reference in its entirety.

BACKGROUND

1. Technical Field

Various embodiments presented herein relate to a data storage device, and more particularly, to a method for improving the reliability of a data storage device.

2. Related Art

Computing has become ubiquitous so that computer systems can be used essentially anytime and anywhere. Because of this, the use of portable electronic devices such as mobile phones, digital cameras, and notebook computers has rapidly increased. In general, such portable electronic devices use a data storage device which uses a memory device. The data storage device may be used as a main memory device or an auxiliary memory device of a portable electronic device.

A data storage device using a memory device provides advantages at least because there is no mechanical driving part. As a result, stability and durability are excellent, information access speed is high and power consumption is low. Data storage devices having such advantages include a USB (universal serial bus) memory device, a memory card having various interfaces, and a solid state drive (SSD).

As large capacity files such as music files and video files are reproduced in a portable electronic device, a data storage device is required to have a large storage capacity. In order to secure a large storage capacity, a data storage device includes a memory device with a large number of integrated memory cells, for example, a flash memory device may be used as a nonvolatile memory device.

A flash memory device does not support overwrite due to a structural characteristic. That is to say, memory cells which are programmed cannot be updated with new data until the memory cells are erased. Therefore, in order to program new data to the flash memory device, an erase operation should be carried out prior to writing new data. This is referred to as an erase-before-program operation. In other words, memory cells of the flash memory device which are in the program state should be initialized to an initial state or an erase state before new data are programmed.

However, the erase operation of the flash memory device requires an undesirably long time. For this reason, a controller for controlling the flash memory device preferably does not reprogram data to programmed memory cells. Instead, the controller of the data storage device programs data to memory cells which are recovered to an erase state.

Due to such an operation of the controller of the data storage device, memory cells of the flash memory device store both valid data and invalid data. As the case may be, the controller of the data storage device selectively performs a merge operation to gather valid data to continuous locations and to erase invalid data.

SUMMARY

An operating method of a data storage device which can improve the reliability of the data storage device by managing a list of target blocks to merge is described herein.

In one implementation, a method of operating a data storage device includes one or more nonvolatile memory devices, the method including making a victim block list, the list including information identifying blocks of the memory devices for which a merge operation is to be performed, copying valid pages of the victim blocks included in the victim block list, to a merge block, determining whether a victim block includes an erase-held valid page, the erase-held valid page being paired with a paired page which has not been copied to the merge block, selectively erasing one or more victim blocks included in the victim block list, where the one or more victim blocks are selected for erasing based on the one or more victim blocks not including an erase-held valid page, and updating the victim block list according to which victim blocks are selected for erasing.

Another implementation is a method of operating a data storage device including one or more nonvolatile memory devices, the method including selecting victim blocks, where the selected victim blocks include target blocks for which a merge operation is to be performed, including information identifying the victim blocks in a victim block list, copying one or more valid pages of the victim blocks, to a merge block, including in the victim block list, information identifying an erase-held valid page of a first victim block in the victim block list, where the erase-held valid page is paired with a paired page which has not been copied to the merge block, erasing a second victim block, and removing the information identifying the erased second victim block from the victim block list.

In another implementation, a data storage device includes a memory which in turn includes a plurality of blocks each including a plurality of pages. The data storage device further includes a controller configured to: generate a victim block list, the list including information identifying blocks of the memory for which a merge operation is to be performed, copy valid pages of the victim blocks included in the victim block list, to a merge block, determine whether a victim block includes an erase-held valid page, the erase-held valid page being paired with a paired page which has not been copied to the merge block, selectively erase one or more victim blocks included in the victim block list, where the one or more victim blocks are selected for erasing based on the one or more victim blocks not including an erase-held valid page, and update the victim block list according to which victim blocks are selected for erasing.

BRIEF DESCRIPTION OF THE DRAWINGS

Features, aspects, and embodiments are described in conjunction with the attached drawings, in which.

DETAILED DESCRIPTION

Figure 1:
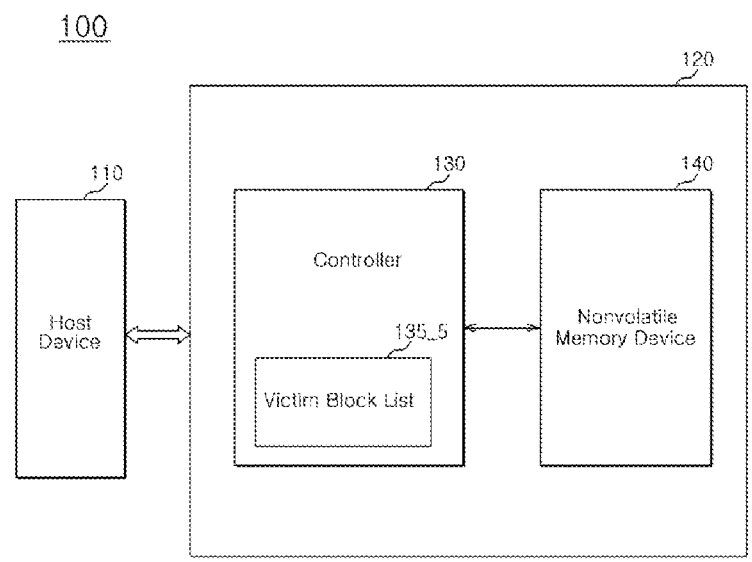
FIG. 1 is a block diagram exemplarily showing a data processing system including a data storage device in accordance with an embodiment.

In the following exemplary embodiments, various advantages, features and methods are explained with reference to the drawings. The features and aspects discussed may, however, be embodied in different forms and should not be construed as being limited to the embodiments set forth herein. Rather, these embodiments are provided to describe the features and aspects in detail to the extent that a person skilled in the art to which the disclosure pertains can make and use the disclosed features.

It is to be understood that practical embodiments are not limited to the particular details shown in the drawings and that the drawings are not necessarily to scale and in some instances proportions may have been exaggerated in order to more clearly depict certain features. While particular terminology is used herein, it is to be appreciated that the terminology used herein is for the purpose of describing particular embodiments only and is not intended to limit the scope of the disclosure.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is generally intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, exemplary embodiments of an operating method of a data storage device are described with reference to the accompanying drawings.

Figure 2:
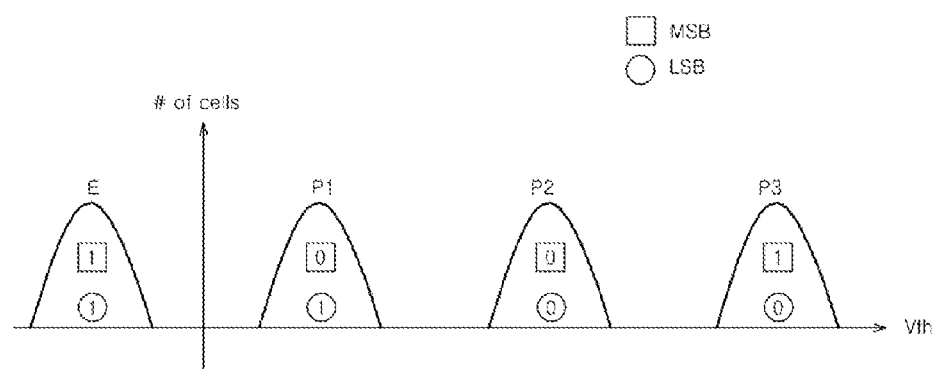
FIG. 2 is a graph exemplarily showing threshold voltage distributions of memory cells of a nonvolatile memory device in accordance with an embodiment.

FIG. 1 is a block diagram exemplarily showing a data processing system including a data storage device in accordance with an embodiment. Further, FIG. 2 is a graph exemplarily showing threshold voltage distributions of memory cells of a nonvolatile memory device in accordance with an embodiment.

Referring to FIG. 1, a data processing system 100 includes a host device 110 and a data storage device 120.

The host device 110 includes, for example, a portable electronic device such as a mobile phone, an MP3 player, and so forth, or an electronic device such as a laptop computer, a desktop computer, a game machine, a TV, a beam projector, and so forth.

The data storage device 120 is configured to operate in response to a request from the host device 110. The data storage device 120 is configured to store data accessed by the host device 110. Accordingly, the data storage device 120 may be used as a main memory device or an auxiliary memory device of the host device 110. The data storage device 120 includes a controller 130 and a nonvolatile memory device 140. The data storage device 120 may be a memory card which is connected with the host device 110 through an interface. Alternatively, data storage device 120 may be a solid state drive (SSD).

The controller 130 is configured to control the nonvolatile memory device 140 in response to a request from the host device 110. For example, the controller 130 is configured to provide data read from the nonvolatile memory device 140, to the host device 110. In some embodiments, the controller 130 is configured to store the data provided from the host device 110, to the nonvolatile memory device 140. For this operation, the controller 130 is configured to control read, program (or write) and erase operations of the nonvolatile memory device 140.

For instance, the nonvolatile memory device 140 may comprise a flash memory device. Hereinafter, for the sake of convenience in explanation, the nonvolatile memory device 140 is described as a flash memory device. It will be appreciated that the nonvolatile memory device 140 may be or include another nonvolatile memory device instead of or in addition to the flash memory device.

Because of its structure, the flash memory device 140 may perform a read or program operation in units of pages. Further, because of its structure, the flash memory device 140, may perform an erase operation in units of blocks.

While not shown, the flash memory device 140 includes a plurality of memory cells. Each of the memory cells may store 2 or more-bit data. A memory cell capable of storing 2 or more-bit data is referred to as a multi-level cell (MLC). The multi-level cell (MLC) is programmed to have a threshold voltage which corresponds to any one of an erase state and a plurality of program states. For example, as shown in FIG. 2 in which a threshold voltage distribution of a multi-level cell (MLC) capable of storing 2-bit data is shown, the multi-level cell (MLC) is programmed to have a threshold voltage which corresponds to any one of an erase state E and program states P1, P2 and P3.

The multi-level cell (MLC) capable of storing 2-bit data is programmed to have a threshold voltage which corresponds to the erase state E or any one of the program states P1, P2 and P3 for each of LSB (least significant bit) data and MSB (most significant bit) data. Because the multi-level cell (MLC) is determined to have one state (that is, the erase state E or any one of the program states P1, P2 and P3) according to the combination of the LSB data and the MSB data, the LSB data and the MSB data are referred to as paired data. Further, an LSB page for reading or programming the LSB data and an MSB page for reading or programming the MSB data are referred to as paired pages.

For instance, in programming the 2-bit multi-level cell (MLC), in order to avoid interference between memory cells or reduce the threshold voltage margins of the memory cell, in some embodiments, the LSB data are programmed earlier than the MSB data. In programming the multi-level cell (MLC), the LSB page is programmed earlier than the MSB page. If a power error or a program error occurs while performing a program operation for the MSB page, not only the MSB page but also the previously programmed LSB page are affected. The state of the multi-level cell (MLC) determined according to the combination of the LSB data and the MSB data may become uncertain.

As discussed above, a merge operation may be performed by collecting valid data together, for example, in a contiguous region of memory, and erasing invalid data outside the contiguous region. When performing the merge operation, a power error or a program error may occur while the MSB page is copied to a new block. If such a power error occurs, both the MSB page and the LSB page paired with the MSB page may be influenced. In this case, if the paired LSB page is not erased, a problem is likely to be caused because the LSB page has previously been programmed with data. To address the problem, a procedure of copying again both the LSB page and the MSB page to the new block may be used. However, if the LSB page in which valid data are stored is erased and the valid data are lost, a problem may be caused in terms of the reliability of data.

According to some embodiments, the controller 130 is configured to manage a list 135_5 for blocks (hereinafter, referred to as "victim blocks") for which a merge operation is to be performed. The controller 130 may include, for example, victim blocks in the victim block list 135_5 when the merge operation is started. The controller 130 copies valid pages of the victim blocks to a new block (hereinafter, referred to as a "merge block"). After some or all of the valid pages of the victim blocks are copied to the merge block, the controller 130 determines which victim blocks have had all of their valid pages successfully copied to the merge block. According to the determination result, the controller 130 erases only victim blocks of which all valid pages are copied to the merge block, and removes the erased victim blocks from the victim block list 135_5.

After all the valid pages of the victim blocks are copied to the merge block, the controller 130 determines valid pages (hereinafter, referred to as "erase-held pages") which have not been copied to the merge block. The controller 130 maintains victim blocks having erase-held valid pages in the victim block list 135_5. Accordingly, the controller 130 does not erase victim blocks which include erase-held valid pages. The victim blocks which are not removed from the victim block list 135_5 are erase-held even though the data of some valid pages of the victim block have been copied to the merge block. In subsequent operations, if the erase-held valid pages of the victim blocks remaining in the victim block list 135_5 are copied to the merge block, the victim blocks are erased and are removed from the victim block list 135_5. Such a victim block list 135_5 and such a merge operation referring to the victim block list 135_5 will be described below in additional detail.

Figure 3:
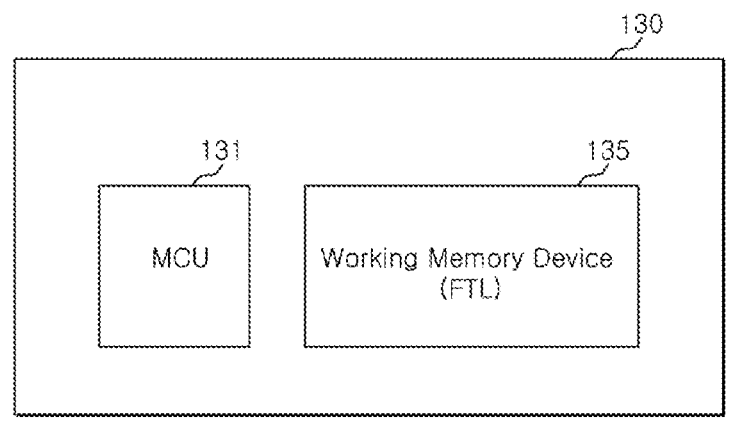
FIG. 3 is a block diagram exemplarily showing the controller of the data storage device shown in FIG. 1.

FIG. 3 is a block diagram exemplarily showing the controller of the data storage device shown in FIG. 1. Referring to FIG. 3, the controller 130 includes a micro controller unit (hereinafter, referred to as an "MCU") 131 and a working memory device 135 having a flash translation layer (FTL). However, it is to be noted that the component elements of the controller 130 are not limited to these component elements. For example, the controller 130 may further include a host interface, a memory interface, an error correction code (ECC) unit, and so forth.

The MCU 131 controls general operations of the controller 130. The MCU 131 may be configured to drive firmware for controlling the general operations of the controller 130. The firmware may be driven by being loaded on the working memory device 135. The MCU 131 may provide commands, addresses, control signals and data for controlling the flash memory device 140 (see FIG. 1), according to a request from the host device 110 (see FIG. 1).

Firmware and data for driving the data storage device 120 (see FIG. 1) may be stored in the working memory device 135. The working memory device 135 may include, for example at least one of a cache, a DRAM, an SRAM, an ROM and a NOR flash memory device. According to the illustrated embodiment, a flash translation layer (FTL) is stored in the working memory device 135. Upon a request from the host device 110, the flash translation layer (FTL) is driven by the MCU 131.

Figure 4:
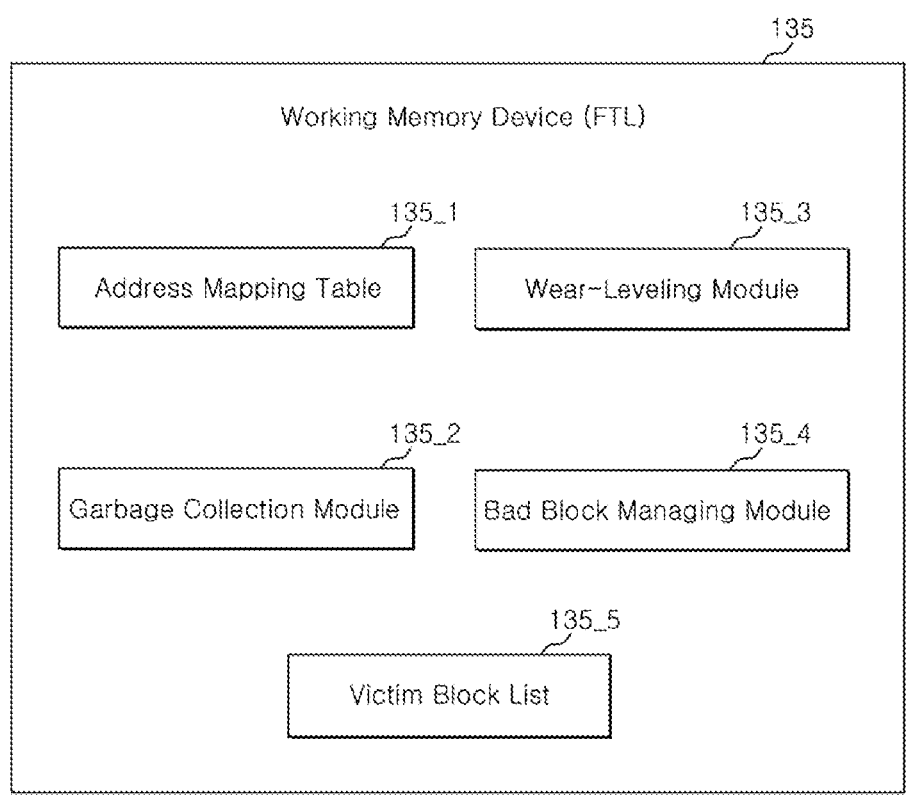
FIG. 4 is a block diagram explaining firmware driven in the working memory device of FIG. 3.

FIG. 4 is a block diagram illustrating an embodiment of firmware driven in the working memory device 135 of FIG. 3.

As discussed above, the flash memory device 140 performs a read or program operation on pages. Further, the flash memory device 140 performs an erase operation on blocks. Moreover, the flash memory device 140 may not be overwritten without first erasing previous data. In other words, a flash memory cell stored with data should be erased to store new data.

Because of these characteristics of the flash memory device 140, the data storage device 120 (see FIG. 1) may use additional software called disk emulation software to ensure compatibility with the host device 110 (see FIG. 1). With the software, the data storage device 120 manages firmware, such as a flash translation layer (FTL), to ensure compatibility with the host device 110.

The flash translation layer FTL manages the read, program and erase operations of the flash memory device 140 such that the data storage device 120 operates in response to accesses (for example, read and write operations) requested from a file system of the host device 110. Accordingly, the file system of the host device 110 may interface with the data storage device 120 including the flash memory device 140 as if it were a general data storage device such as a hard disk.

Referring to the embodiment of FIG. 4, the working memory device 135 includes the flash translation layer (FTL), which includes a plurality of modules. For example, the flash translation layer (FTL) may include an address mapping table 135_1, a garbage collection module 135_2, a wear-leveling module 135_3, a bad block managing module 135_4, and a victim block list 135_5. However, it is to be readily understood that the configuration of the flash translation layer (FTL) is not limited to the above-described modules. For example, the flash translation layer (FTL) may further include an interleaving module for operating in parallel flash memory devices, a sudden power-off managing module for preparing against an unpredicted power-off, and so forth.

In the case where the host device 110 accesses the data storage device 120 (for example, in the case where a read or write operation is requested), the host device 110 provides a logical address to the data storage device 120. The flash translation layer (FTL) translates the provided logical address into a physical address of the flash memory device 140 and performs the requested operation by referring to the translated physical address. To allow such an address translating operation, the flash translation layer (FTL) manages address translation data, such as data stored in the address mapping table 135_1.

The garbage collection module 135_2 manages blocks in which segmented data are stored. The flash memory device 140 is written after previous data has been erased and has an erase unit which is larger than a program unit. For this reason, the flash memory device 140 collects data dispersed at physically different locations to the same address region by using randomly selected available locations when a storage space approaches a limit. The garbage collection module 135_2 performs the operation of collecting segmented valid data to the same address region by performing a plurality of write operations and a plurality of erase operations.

The wear-leveling module 135_3 manages wear levels of blocks of the flash memory device 140. Memory cells of the flash memory device 140 are aged by program and erase operations. Aged memory cells, that is, worn memory cells may experience defects (for example, physical defects). The wear-leveling module 135_3 manages the usage of the memory cells such that the erase-write counts of the memory cells are about the same. This prevents one block of the flash memory device 140 from being worn more rapidly than the other blocks.

The bad block managing module 135_4 prevents use of blocks which have defects. As described above, worn memory cells may have defects (for example, physical defects). Data stored in the memory cells which have defects may not be normally read. Also, data may not be normally stored in the memory cells which have defects. The bad block managing module 135_4 manages block selection such that the use of blocks including the memory cells which have defects is prevented.

As described above, a merge operation is performed by copying the segments of segmented data to one place and erasing the now invalid data at the source memory locations. Such a merge operation may be performed during a garbage collecting operation, a wear leveling operation, or a bad block managing operation. The victim block list 135_5 includes a list of blocks for which a merge operation is to be performed, that is, victim blocks. Further, the victim block list 135_5 may include a list of valid paired pages which are not copied to a merge block, that is, a list of erase-held valid pages.

Figure 5:
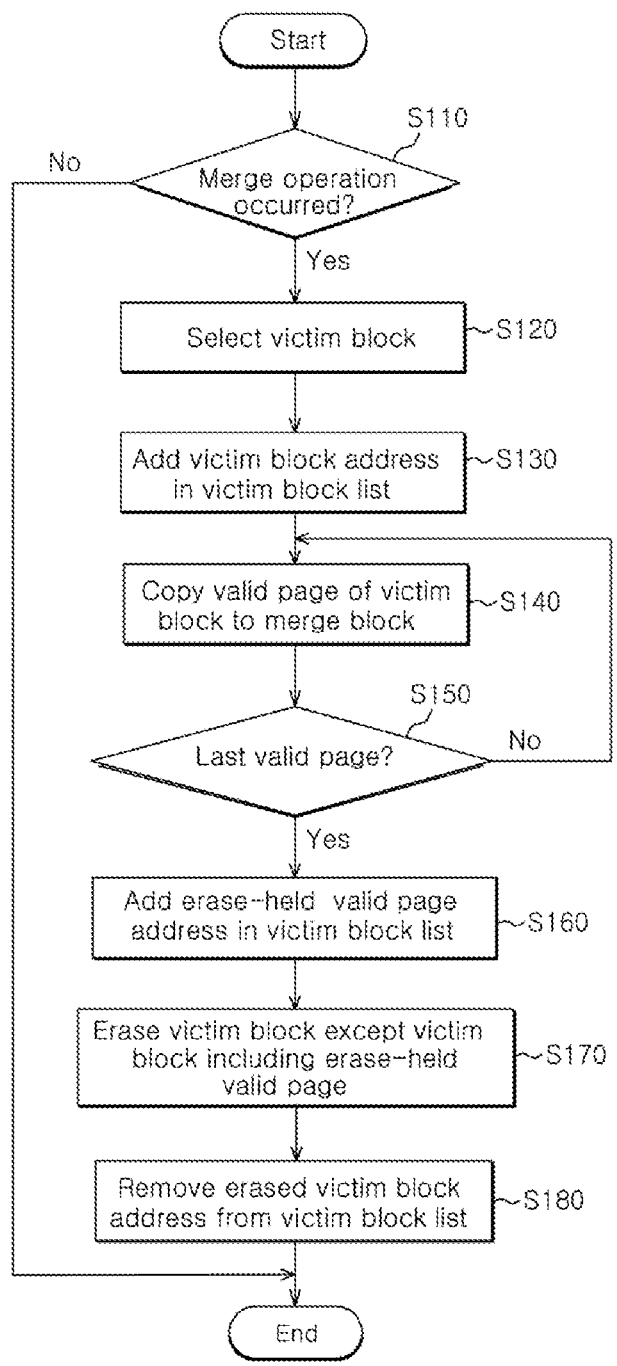
FIG. 5 is a flow chart exemplarily explaining an operating method of a data storage device in accordance with an embodiment.

FIG. 5 is a flow chart exemplarily explaining a method of operating a data storage device in accordance with an embodiment. With reference to FIG. 5, a method of using the controller 130 (see FIG. 1) for making and utilizing a victim block list when a merge operation occurs is described.

In step S110, whether a merge operation occurred is determined. In the case where the merge operation did not occur (in the case of No), the procedure is ended, and, in the case where the merge operation occurred (in the case of Yes), the procedure proceeds to step S120.

In step S120, victim blocks are selected. As described above, victim blocks include target blocks for which the merge operation is to be performed, that is, blocks which include valid pages to be copied to a merge block. In step S130, the addresses of the victim blocks are added to a victim block list. In step S140, the valid pages (or data of the valid pages) of the victim blocks are copied to the merge block.

In step S150, it is determined whether the last of the valid pages of the victim blocks have been copied. In the case where it is determined that the last valid page of the victim block has not been copied (in the case of No), the procedure proceeds to step S140. Step S140 and step S150 are repeatedly performed until the last valid page of the victim blocks is copied. In the case where it is determined that the last valid page of the victim blocks has been copied (in the case of Yes), the procedure proceeds to step S160.

In step S160, the addresses of erase-held valid pages are added to the victim block list. That is to say, the addresses of valid paired pages which were not copied to the merge block are added to the victim block list.

In step S170, victim blocks included in the victim block list, other than those victim blocks which include the erase-held valid pages, are erased. In step S180, the addresses of the erased victim blocks are removed from the victim block list.

According to the above-described procedure, the victim blocks not removed from the victim block list are not erased. For this reason, the erase-held valid pages are not erased until the paired pages thereof are copied. Accordingly, even when a power error or a program error occurs while the paired pages of the erase-held valid pages are copied to the merge block, the erase-held valid pages and the paired pages thereof may be recovered.

Although not shown in the flow chart of FIG. 5, if the erase-held valid pages of the victim blocks not removed from the victim block list and the paired pages thereof are all copied to the merge block through a subsequent merge operation, corresponding victim blocks are erased, and the addresses of the corresponding victim blocks are removed from the victim block list.

Figure 6:
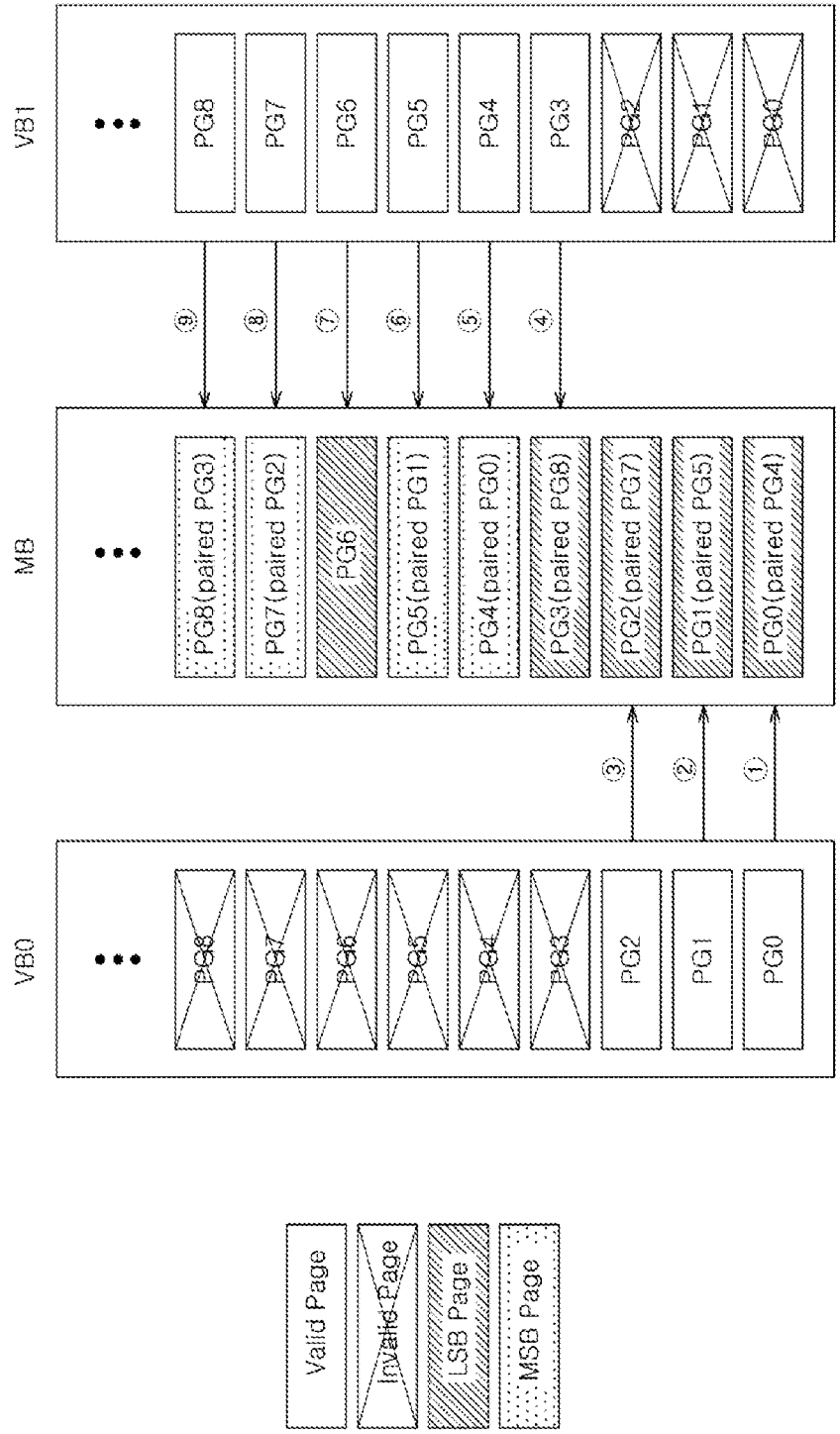
FIG. 6 is a diagram exemplarily showing a merge operation in accordance with an embodiment.
Figure 7:
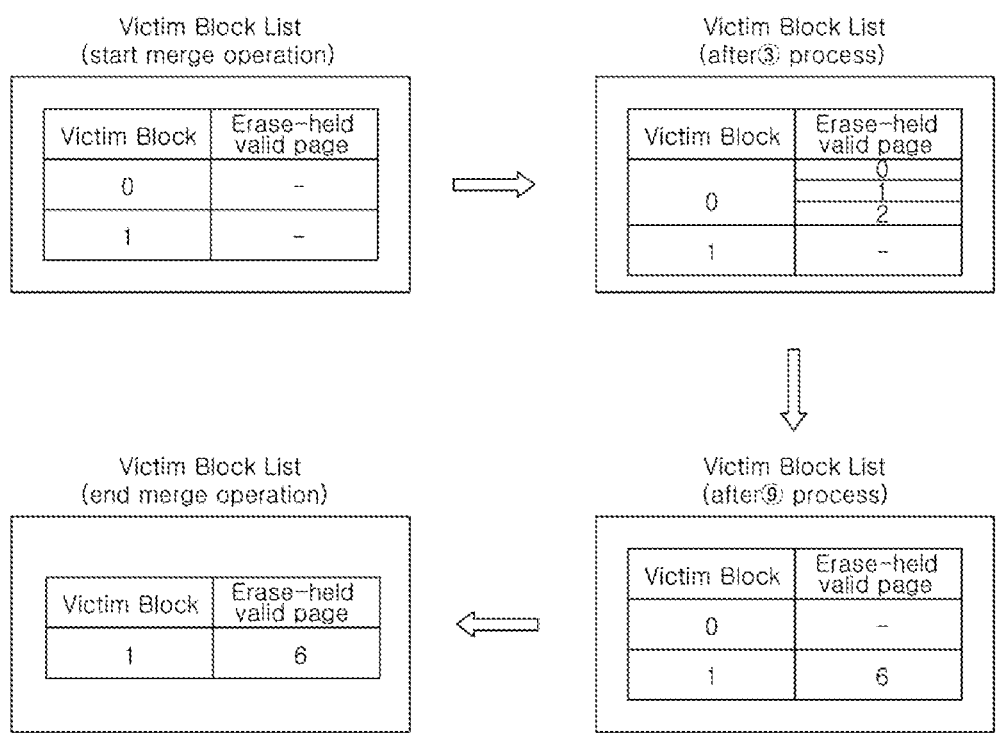
FIG. 7 is a diagram exemplarily showing a victim block list which is changed when the merge operation of FIG. 6 is performed.

FIG. 6 is a diagram exemplarily showing a merge operation in accordance with an embodiment. Further, FIG. 7 is a diagram exemplarily showing a victim block list which is changed when the merge operation of FIG. 6 is performed. In describing FIGS. 6 and 7, it is assumed that victim blocks VB0 and VB1 are selected and valid pages of the victim blocks VB0 and VB1 are copied to a merge block MB. A method of managing a victim block list is described below with reference to FIGS. 6 and 7.

As a merge operation is started, the addresses of the victim blocks VB0 and VB1 are included in a victim block list because they include segregated data which is to be merged. After the addresses of the victim blocks VB0 and VB1 are included in the victim block list, pages PG0 to PG2 of the victim block VB0 are sequentially copied to the merge block MB as in actions ①, ② and ③ indicated in FIG. 6.

After the last valid page PG2 of the victim block VB0 is copied (that is, the action ③ is completed), the addresses of erase-held valid pages are included in the victim block list. As can be readily seen from the drawing, all the valid pages PG0 to PG2 of the victim block VB0 are LSB pages. Accordingly, because paired pages (that is, MSB pages) associated with the valid pages PG0 to PG2 are not copied to the merge block MB, the valid pages PG0 to PG2 are classified as erase-held valid pages, and the addresses of the erase-held valid pages PG0 to PG2 are included in the victim block list.

After all the valid pages PG0 to PG2 of the victim block VB0 are copied to the merge block MB, valid pages PG3 to PG8 of the victim block VB1 are sequentially copied to the merge block MB as in actions ④, ⑤, ⑥, ⑦, ⑧ and ⑨.

After the last valid page PG8 of the victim block VB1 is copied (that is, the action ⑨ is completed), the addresses of valid paired pages which have been copied are removed from the victim block list, and the addresses of valid pages of which paired pages are not copied are included in the victim block list.

As can be readily seen from the drawing, the valid pages PG4, PG5 and PG7 of the victim block VB1 are MSB pages. The valid page PG4 of the victim block VB1 is the paired page of the valid page PG0 which is already copied to the merge block MB. The valid page PG5 of the victim block VB1 is the paired page of the valid page PG1 which is already copied to the merge block MB. Also, the valid page PG7 of the victim block VB1 is the paired page of the valid page PG2 which is already copied to the merge block MB. In other words, the paired pages PG4, PG5, PG7 of the erase-held valid pages PG0 to PG2 of the victim block VB0 have been copied to the merge block MB. Accordingly, the addresses of the erase-held valid pages PG0 to PG2 are removed from the victim block list.

The valid page PG6 of the victim block VB1 is an LSB page. Because a paired page (that is, an MSB page) of the valid page PG6 is not copied to the merge block MB, the valid page PG6 is, accordingly, an erase-held valid page, and the address of the erase-held valid page PG6 is included in the victim block list.

After the valid pages of the victim blocks VB0 and VB1 are copied to the merge block MB, the victim block VB0 included in the victim block list is erased. Further, the address of the erased victim block VB0 is removed from the victim block list.

The victim block VB1 is not removed from the victim block list and is not erased. As a result, even if a power error or a program error occurs while the paired page of the erase-held valid page PG6 is copied to the merge block, the data of the erase-held valid page PG6 may be recovered by a subsequent merge operation.

Figure 8:
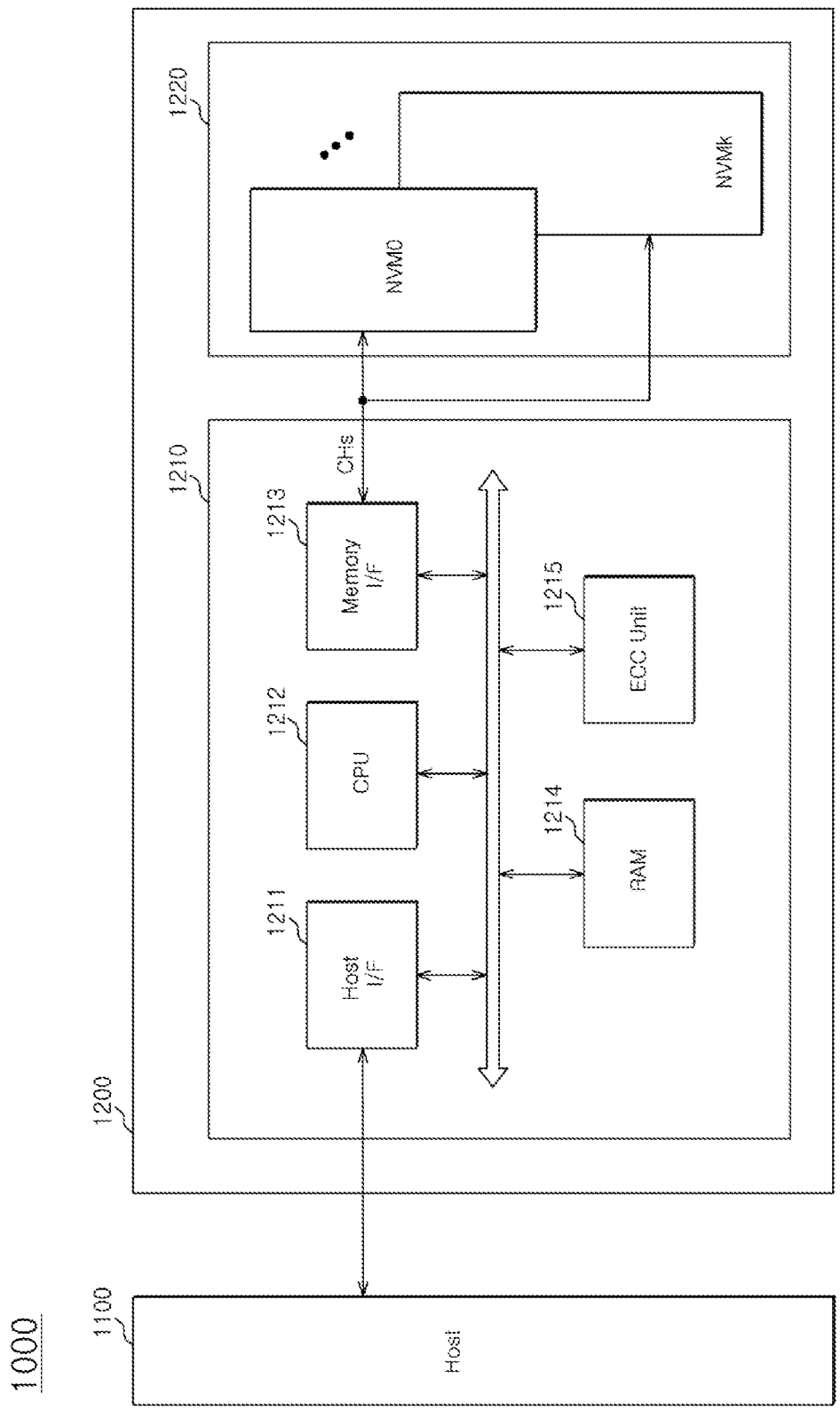
FIG. 8 is a block diagram exemplarily showing a data processing system in accordance with another embodiment.

FIG. 8 is a block diagram exemplarily showing a data processing system in accordance with another embodiment. Referring to FIG. 8, a data processing system 1000 includes a host 1100 and a data storage device 1200. The data storage device 1200 includes a controller 1210 and a data storage medium 1220. The data storage device 1200 is connected to the host 1100 such as a desktop computer, a notebook computer, a digital camera, a mobile phone, an MP3 player, a game machine, and the like. The data storage device 1200 is also referred to as a memory system.

The controller 1210 is connected to the host 1100 and the data storage medium 1220. The controller 1210 is configured to access the data storage medium 1220, for example, in response to a request from the host 1100. For example, the controller 1210 is configured to control the read, program or erase operation of the data storage medium 1220. The controller 1210 is configured to drive a firmware for controlling the data storage medium 1220. The controller 1210 performs a merge operation through a victim block list in accordance with methods and aspects discussed above. Accordingly, the reliability of the data storage device 1200 may be improved.

The controller 1210 may include well-known components such as a host interface 1211, a central processing unit 1212, a memory interface 1213, a RAM 1214, and an error correction code unit 1215.

The central processing unit 1212 is configured to control the general operations of the controller 1210 in response to a request from the host 1100. The RAM 1214 may be used as a working memory of the central processing unit 1212. The RAM 1214 may temporarily store the data read from the data storage medium 1220 or the data provided from the host 1100.

The host interface 1211 is configured to interface the host 1100 and the controller 1210. For example, the host interface 1211 may be configured to communicate with the host 1100 through one of various interface protocols such as a USB (universal serial bus) protocol, an MMC (multimedia card) protocol, a PCI (peripheral component interconnection) protocol, a PCI-E (PCI-express) protocol, a PATA (parallel advanced technology attachment) protocol, a SATA (serial ATA) protocol, an SCSI (small computer small interface) protocol, an SAS (serial attached SCSI) protocol, and an IDE (integrated drive electronics) protocol.

The memory interface 1213 is configured to interface the controller 1210 and the data storage medium 1220. The memory interface 1213 is configured to provide a command and an address to the data storage medium 1220. Furthermore, the memory interface 1213 is configured to exchange data with the data storage medium 1220.

The error correction code unit 1215 is configured to detect an error of the data read from the data storage medium 1220. Also, the error correction code unit 1215 is configured to correct the detected error when the detected error falls within a correction range. Meanwhile, the error correction code unit 1215 may be provided inside or outside the controller 1210 depending on the memory system 1000.

The controller 1210 and the data storage medium 1220 may be configured as a solid state drive (SSD).

As another example, the controller 1210 and the data storage medium 1220 may be integrated into one semiconductor apparatus and may be configured as a memory card. For example, the controller 1210 and the data storage medium 1220 may be integrated into one semiconductor apparatus and may be configured as a PCMCIA (personal computer memory card international association) card, a CF (compact flash) card, a smart media card, a memory stick, a multimedia card (MMC, RS-MMC and MMC-micro), an SD (secure digital) card (SD, Mini-SD and Micro-SD), a UFS (universal flash storage), etc.

In another example, the controller 1210 or the data storage medium 1220 may be mounted as various types of packages. For example, the controller 1210 or the data storage medium 1220 may be mounted by being packaged into types such as a POP (package on package), a ball grid array (BGA) package, a chip scale package (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat package (MQFP), a thin quad flat package (TQFP), a small outline IC (SOIC), a shrink small outline package (SSOP), a thin small outline package (TSOP), a thin quad flat package (TQFP), a system in package (SIP), a multi-chip package (MCP), a wafer-level fabricated package (WFP), and a wafer-level processed stack package (WSP).

Figure 9:
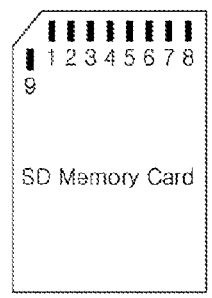
FIG. 9 is a diagram exemplarily showing a memory card in accordance with an embodiment.

FIG. 9 is a diagram exemplarily showing a memory card in accordance with an embodiment. FIG. 9 shows the outer appearance of an SD (secure digital) card.

Referring to FIG. 9, the SD card includes one command pin (for example, a second pin), one clock pin (for example, a fifth pin), four data pins (for example, first, seventh, eighth and ninth pins), and three power pins (for example, third, fourth and sixth pins).

Through the command pin (the second pin), a command and a response signal are transmitted. In general, the command is transmitted to the SD card from a host, and the response signal is transmitted to the host from the SD card.

The data pins (the first, seventh, eighth and ninth pins) are divided into reception (Rx) pins for receiving data transmitted from the host and transmission (Tx) pins for transmitting data to the host. The reception (Rx) pins and the transmission (Tx) pins are provided in pairs to transmit differential signals.

Figure 10:
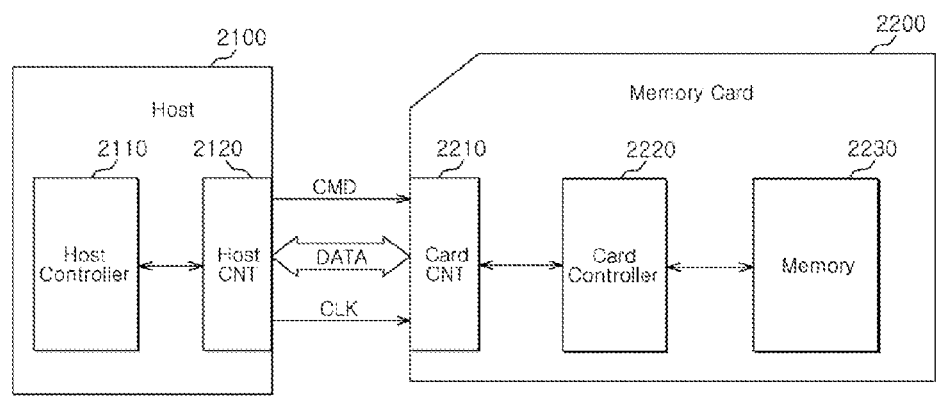
FIG. 10 is a block diagram showing the internal configuration of the memory card shown in FIG. 9 and the connection relationship between the memory card and a host.

FIG. 10 is a block diagram showing an embodiment of the internal configuration of the memory card shown in FIG. 9 and a connection relationship between the memory card and a host. Referring to FIG. 10, a data processing system 2000 includes a host 2100 and a memory card 2200.

The host 2100 includes a host controller 2110 and a host connection unit 2120. The memory card 2200 includes a card connection unit 2210, a card controller 2220, and a memory device 2230. The card controller 2220 performs a merge operation through a victim block list in accordance with methods and aspects discussed above. Accordingly, the reliability of the memory card 2200 may be improved.

The host connection unit 2120 and the card connection unit 2210 include a plurality of pins. The pins may include a command pin, a clock pin, a data pin, and a power pin. The number of pins changes depending on the kind of the memory card 2200.

The host 2100 stores data in the memory card 2200 or reads data stored in the memory card 2200.

The host controller 2110 transmits a write command CMD, a clock signal CLK generated from a clock generator (not shown) in the host 2100, and data DATA to the memory card 2200 through the host connection unit 2120. The card controller 2220 operates in response to the write command received through the card connection unit 2210. The card controller 2220 stores the received data DATA in the memory device 2230, using a clock signal generated from a clock generator (not shown) in the card controller 2220, according to the received clock signal CLK.

The host controller 2110 transmits a read command CMD and a clock signal CLK generated from a clock generator (not shown) in the host 2100 to the memory card 2200 through the host connection unit 2120. The card controller 2220 operates in response to the read command received through the card connection unit 2210. The card controller 2220 reads data from the memory device 2230 using a clock signal generated from a clock generator (not shown) in the card controller 2220, according to the received clock signal CLK, and transmits the read data to the host controller 2110.

Figure 11:
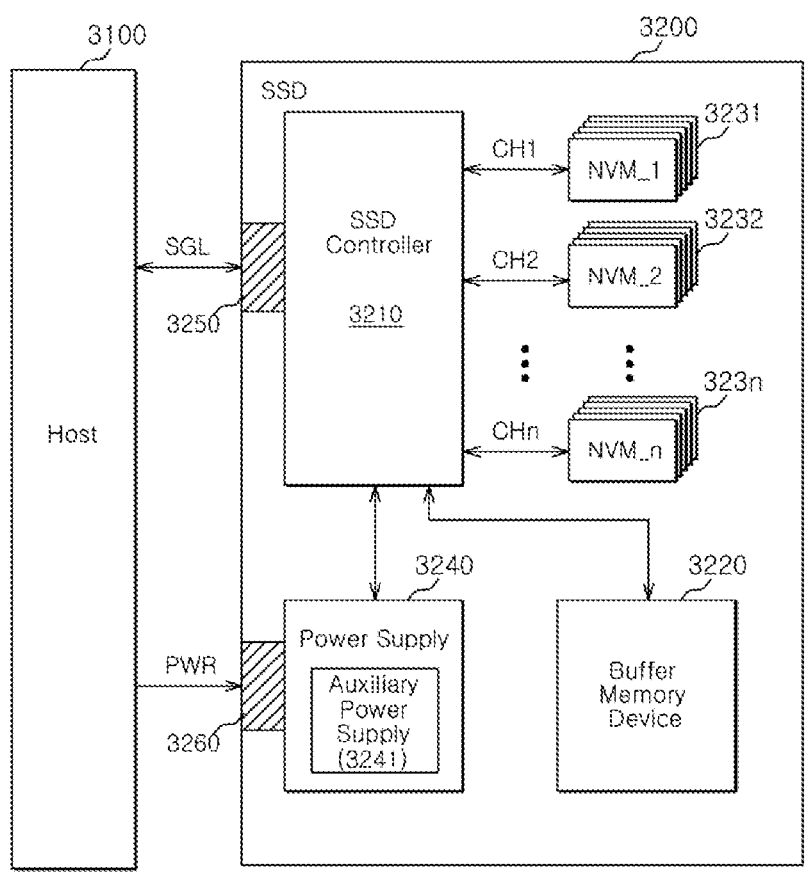
FIG. 11 is a block diagram showing an SSD in accordance with an embodiment.

FIG. 11 is a block diagram showing an SSD in accordance with an embodiment. Referring to FIG. 11, a data processing system 3000 includes a host 3100 and an SSD 3200.

The SSD 3200 includes an SSD controller 3210, a buffer memory device 3220, nonvolatile memory devices 3231 to 323n, a power supply 3240, a signal connector 3250, and a power connector 3260.

The SSD 3200 operates in response to a request from the host 3100. That is to say, the SSD controller 3210 is configured to access the nonvolatile memory devices 3231 to 323n in response to a request from the host 3100. For example, the SSD controller 3210 is configured to control read, program and erase operations of the nonvolatile memory devices 3231 to 323n. Further, the SSD controller 3210 performs a merge operation through a victim block list in accordance with methods and aspects discussed above. Accordingly, the reliability of the SSD 3200 may be improved.

The buffer memory device 3220 is configured to temporarily store data which are to be stored in the nonvolatile memory devices 3231 to 323n. Further, the buffer memory device 3220 is configured to temporarily store data which are read from the nonvolatile memory devices 3231 to 323n. The data temporarily stored in the buffer memory device 3220 are transmitted to the host 3100 or the nonvolatile memory devices 3231 to 323n under the control of the SSD controller 3210.

The nonvolatile memory devices 3231 to 323n are used as storage media of the SSD 3200. The nonvolatile memory devices 3231 to 323n are connected to the SSD controller 3210 through a plurality of channels CH1 to CHn, respectively. One or more nonvolatile memory devices may be connected to one channel. The nonvolatile memory devices connected to one channel are connected to the same signal bus and data bus.

The power supply 3240 is configured to provide power PWR inputted through the power connector 3260 to the inside of the SSD 3200. The power supply 3240 includes an auxiliary power supply 3241. The auxiliary power supply 3241 is configured to supply power so as to allow the SSD 3200 to be normally terminated when sudden power-off occurs. The auxiliary power supply 3241 may include super capacitors capable of being charged with power PWR.

The SSD controller 3210 exchanges a signal SGL with the host 3100 through the signal connector 3250. Here, the signal SGL includes a command, an address, data, and the like. The signal connector 3250 may by constituted by a connector such as PATA (parallel advanced technology attachment), SATA (aerial advanced technology attachment), SCSI (small computer small interface), SAS (serial SCSI), and the like, according to an interface scheme between the host 3100 and the SSD 3200.

Figure 12:
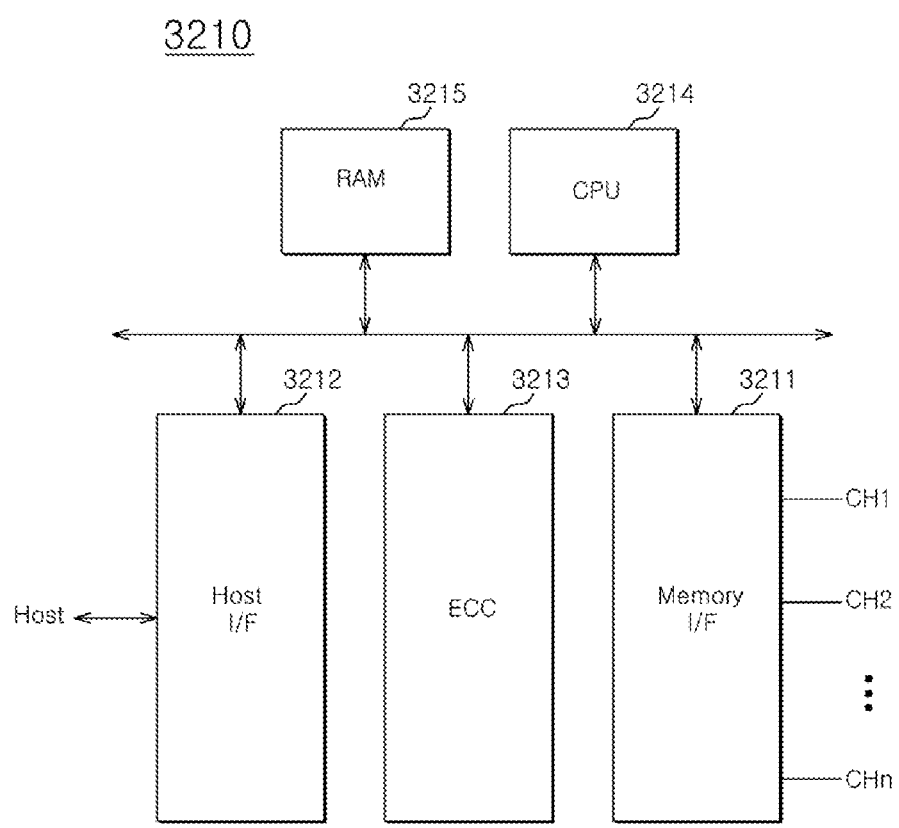
FIG. 12 is a block diagram exemplarily showing the SSD controller shown in FIG. 11.

FIG. 12 is a block diagram exemplarily showing the SSD controller shown in FIG. 11. Referring to FIG. 12, the SSD controller 3210 includes a memory interface 3211, a host interface 3212, an ECC unit 3213, a central processing unit 3214, and a RAM 3215.

The memory interface 3211 is configured to provide a command and an address to the nonvolatile memory devices 3231 to 323n. Moreover, the memory interface 3211 is configured to exchange data with the nonvolatile memory devices 3231 to 323n. The memory interface 3211 may scatter data transmitted from the buffer memory device 3220 to the respective channels CH1 to CHn, under the control of the central processing unit 3214. Furthermore, the memory interface 3211 transmits data read from the nonvolatile memory devices 3231 to 323n to the buffer memory device 3220, under the control of the central processing unit 3214.

The host interface 3212 is configured to provide an interface with the SSD 3200 in correspondence to the protocol of the host 3100. For example, the host interface 3212 may be configured to communicate with the host 3100 through one of PATA (parallel advanced technology attachment), SATA (serial advanced technology attachment), SCSI (small computer small interface) and SAS (serial SCSI) protocols. In addition, the host interface 3212 may perform a disk emulation function of supporting the host 3100 to recognize the SSD 3200 as a hard disk drive (HDD).

The ECC unit 3213 is configured to generate parity bits based on the data transmitted to the nonvolatile memory devices 3231 to 323n. The generated parity bits may be stored in spare areas of the nonvolatile memory devices 3231 to 323n. The ECC unit 3213 is configured to detect an error of data read from the nonvolatile memory devices 3231 to 323n. When the detected error falls within a correction range, the ECC unit 3213 is configured to correct the detected error.

The central processing unit 3214 is configured to analyze and process a signal SGL inputted from the host 3100. The central processing unit 3214 controls general operations of the SSD controller 3210 in response to a request from the host 3100. The central processing unit 3214 controls the operations of the buffer memory device 3220 and the nonvolatile memory devices 3231 to 323n according to a firmware for driving the SSD 3200. The RAM 3215 is used as a working memory device for driving the firmware.

Figure 13:
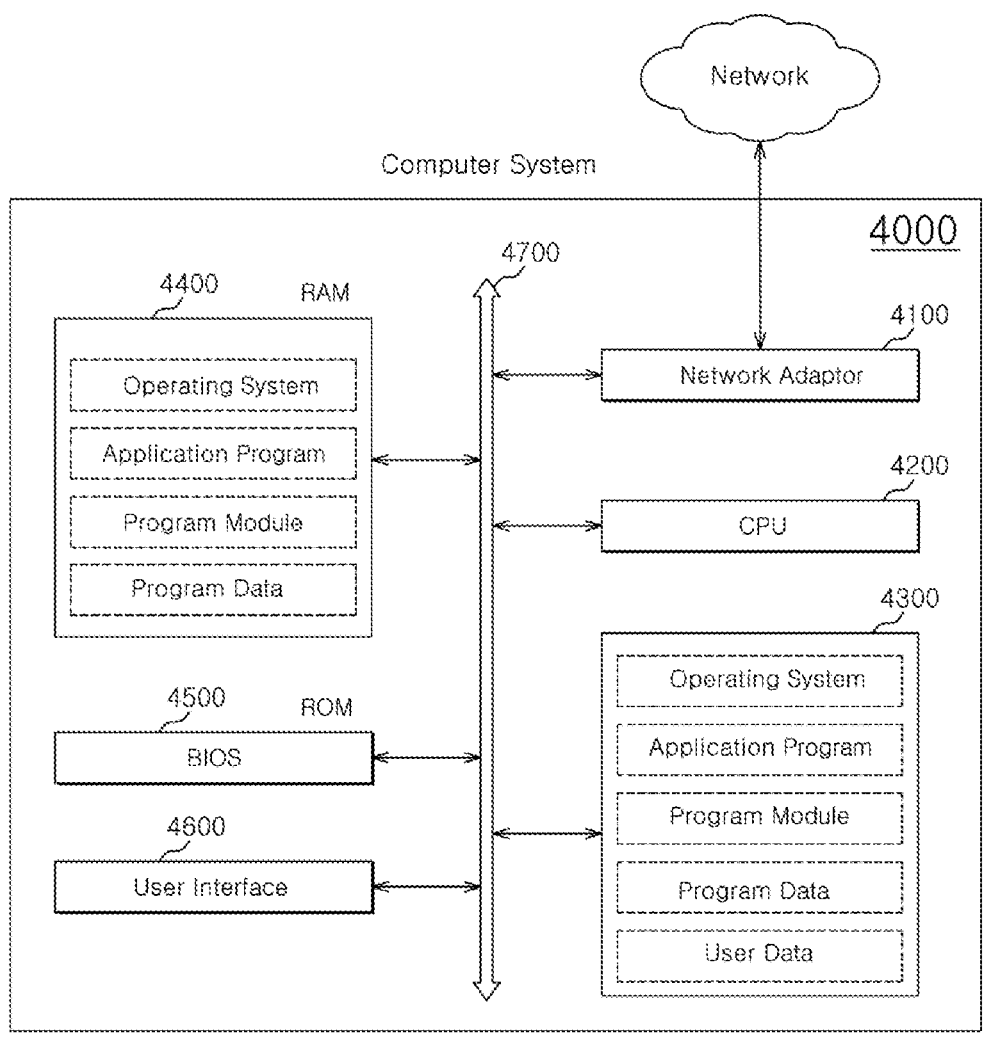
FIG. 13 is a block diagram exemplarily showing a computer system in which a data storage device in accordance with an embodiment is mounted.

FIG. 13 is a block diagram exemplarily showing a computer system including a data storage device in accordance with an embodiment. Referring to FIG. 13, a computer system 4000 includes a network adaptor 4100, a central processing unit 4200, a data storage device 4300, a RAM 4400, a ROM 4500 and a user interface, which are electrically connected to a system bus 4700. The data storage device 4300 may be constituted by the data storage device 120 shown in FIG. 1, the data storage device 1200 shown in FIG. 8 or the SSD 3200 shown in FIG. 11.

The network adaptor 4100 provides interfacing between the computer system 4000 and external networks. The central processing unit 4200 performs general operation processing for driving an operating system residing at the RAM 4400 or an application program.

The data storage device 4300 stores general data necessary in the computer system 4000. For example, an operating system for driving the computer system 4000, an application program, various program modules, program data and user data are stored in the data storage device 4300.

The RAM 4400 may be used as a working memory device of the computer system 4000. Upon booting, the operating system, the application program, the various program modules and the program data necessary for driving programs, which are read from the data storage device 4300, are loaded on the RAM 4400. A BIOS (basic input/output system) which is activated before the operating system is driven is stored in the ROM 4500. Information exchange between the computer system 4000 and a user is implemented through the user interface 4600.

Although not shown in a drawing, it is to be readily understood that the computer system 4000 may further include devices such as an application chipset, a camera image processor (CIS), and the like.

As is apparent from the above descriptions, according to the described embodiments, the reliability of a data storage device may be improved.

While the present invention has been particularly shown and described with reference to exemplary embodiments thereof, it will be understood by those of ordinary skill in the art that various changes in form and details may be made therein without departing from the spirit and scope of the present invention.

What is claimed is:

1. A method of operating a data storage device including one or more nonvolatile memory devices, the method comprising:
    making a victim block list, the list including information identifying blocks of the memory devices for which a merge operation is to be performed;
    copying valid pages of the victim blocks included in the victim block list, to a merge block, the copying including combining least significant bit (LSB) and most significant bit (MSB) pages, among the valid pages in the victim blocks, into paired pages in the merge block;
    determining whether a victim block includes an erase-held valid page, which represents a LSB page, among the valid pages, that has not been combined into the paired pages in the merge block;
    selectively erasing one or more victim blocks included in the victim block list, wherein the one or more victim blocks are selected for erasing based on the one or more victim blocks not including the erase-held valid page; and
    updating the victim block list according to which victim blocks are selected for erasing.

2. The operating method according to claim 1, further comprising maintaining the data of a first victim block which includes the erase-held valid page.

3. The operating method according to claim 2, further comprising maintaining in the victim block list the information identifying the first victim block.

4. The operating method according to claim 2, further comprising including information identifying the erase-held valid page in the victim block list.

5. The operating method according to claim 2, further comprising:
    copying a paired page of the erase-held valid page of the first victim block to the merge block; and
    erasing the first victim block after the copying of the paired page.

6. The operating method according to claim 5, further comprising removing the information identifying the erased first victim blocks from the victim block list.

7. The operating method according to claim 1, further comprising removing the information identifying the erased victim blocks from the victim block list.

8. A method of operating a data storage device including one or more nonvolatile memory devices, the method comprising:
    selecting victim blocks, wherein the selected victim blocks include target blocks for which a merge operation is to be performed;
    including information identifying the victim blocks in a victim block list;
    copying one or more valid pages of the victim blocks, to a merge block, the copying of the one or more valid pages including combining least significant bit (LSB) and most significant bit (MSB) pages, among the valid pages in the victim blocks, into paired pages in the merge block;
    determining whether a victim block includes an erase-held valid page, which represents a LSB page, among the valid pages, that has not been combined into the paired pages in the merge block;
    including in the victim block list, information identifying the erase-held valid page of a first victim block in the victim block list according to a determination result;
    erasing a second victim block according to the determination result; and
    removing the information identifying the erased second victim block from the victim block list.

9. The operating method according to claim 8, further comprising maintaining the data of the first victim block.

10. The operating method according to claim 9, further comprising maintaining in the victim block list the information identifying the first victim block.

11. The operating method according to claim 9, further comprising including information identifying the erase-held valid page in victim block list.

12. The operating method according to claim 9, further comprising:
    copying a paired page of the erase-held valid page of the first victim block to the merge block; and
    erasing the first victim block.

13. The operating method according to claim 12, further comprising removing the information identifying the erased first victim blocks from the victim block list.

14. A data storage device, comprising:
    a memory, comprising a plurality of blocks each comprising a plurality of pages; and
    a controller, configured to:
    generate a victim block list, the victim block list including information identifying blocks of the memory for which a merge operation is to be performed,
    copy valid pages of the victim blocks included in the victim block list, to a merge block,
    determine whether paired least significant bit (LSB) and most significant bit (MSB) pages corresponding to the respective valid pages have been copied to the merge block, wherein each of the paired LSB and MSB pages shares the same memory cells with a corresponding valid page in the merge block;
    designate a valid page as an erase-held valid page when determining that a paired page corresponding to the valid page has not been copied to the merge block;

selectively erase one or more victim blocks included in the victim block list, wherein the one or more victim blocks are selected for erasing based on the one or more victim blocks not including the erase-held valid page, and update the victim block list according to which victim blocks are selected for erasing.

15. The device according to claim 14, wherein the controller is further configured to maintain the data of a first victim block which includes the erase-held valid page.

16. The device according to claim 15, wherein the controller is further configured to maintain in the victim block list the information identifying the first victim block.

17. The device according to claim 15, wherein the controller is further configured to include information identifying the erase-held valid page in the victim block list.

18. The device according to claim 15, wherein the controller is further configured to:

copy the paired page corresponding to the erase-held valid page of the first victim block to the merge block; and erase the first victim block after the copying of the paired page.

19. The device according to claim 18, wherein the controller is further configured to remove the information identifying the erased first victim blocks from the victim block list.

20. The device according to claim 14, wherein the controller is further configured to remove the information identifying the erased victim blocks from the victim block list.

\* \* \* \* \*